235-379 SR

7/21/81 OR 4,280,036

United States Patent [19]

Fukatsu

[11] 4,280,036

[45] Jul. 21, 1981

[54] BANKING APPARATUS USING PASSBOOKS

[75] Inventor: Kunio Fukatsu, Yokohama, Japan

[73] Assignee: Tokyo Shibaura Denki Kabushiki Kaisha, Kawasaki, Japan

[21] Appl. No.: 87,649

[22] Filed: Oct. 23, 1979

[30] Foreign Application Priority Data

| | | | |
|---|---|---|---|
| Oct. 24, 1978 | [JP] | Japan | 53-130053 |
| Oct. 24, 1978 | [JP] | Japan | 53-130055 |
| Oct. 24, 1978 | [JP] | Japan | 53-145314[U] |
| Apr. 11, 1979 | [JP] | Japan | 54-43033 |

[51] Int. Cl.[3] .......................... G06F 15/30; B41J 3/28

[52] U.S. Cl. ....................................... 235/379; 400/25

[58] Field of Search ................. 235/379; 271/8 R, 18; 400/25, 26, 586, 587, 588, 589, 590, 591, 592, 607

[56] References Cited

FOREIGN PATENT DOCUMENTS 48-90145 11/1973 Japan .

50-68194 6/1975 Japan .

*Primary Examiner*—George G. Stellar

*Attorney, Agent, or Firm*—Cushman, Darby & Cushman

[57] ABSTRACT

A banking apparatus using passbooks, such as for example a passbook printing apparatus built-in an automatic depositing machine, in which a passbook inserted in the apparatus is transferred to a printing position by means of a driving belt. A printing mechanism located in the printing position has a single platen on which a journal paper is normally wound. The passbook is positioned in an opened state on the platen keeping the journal paper thereon, and transaction information is printed on the passbook by the printing mechanism. Thereafter, the passbook is removed from the printing position by means of the driving belt, and the transaction information is printed on the journal paper by the printing mechanism. A page turning mechanism for the passbook is arranged in the vicinity of the printing mechanism.

21 Claims, 26 Drawing Figures

BANKING APPARATUS USING PASSBOOKS

BACKGROUND OF THE INVENTION

This invention relates to a passbook printing apparatus used with e.g. an automatic depositing machine having a function to handle record documents such as passbooks.

Recently, automatic depositing machines with the aforesaid function have been developed and put to practical use.

With one such automatic depositing machine, on-line processing requires registering of unregistered information for transactions preceeding the transaction concerned, such as information for transactions made only by means of a magnetic card or information derived from automatic transfer account transactions, as information to be printed on passbooks and other record documents (hereinafter referred to simply as passbooks), not to mention printing of the information for the transaction concerned.

Incidentally, there has recently been developed and put to practical use automatic depositing machines capable of handling passbooks which have a partial magnetic medium stuck to the back cover thereof. Namely, these passbooks have a function of magnetic cards as well as that of conventional passbooks. In the automatic depositing machine, the aforementioned transaction information is printed on a passbook which is opened and inserted into the machine through an inlet, and also similar transaction information is separately printed on a journal paper contained in the machine for the purpose of totalization of transactions or duplication.

As for transaction information for automatic cash dispensing machines which make transactions by means of identification cards instead of passbooks, they are printed on the passbook and journal paper with a terminal apparatus by a bank clerk in charge when a user later brings and submits the passbook to the teller's window of a bank.

However, in the prior art apparatus, whether the automatic depositing machine or terminal apparatus, separate printing mechanisms, especially platens, are provided for passbook printing and for journal paper printing. That is, printing positions for the passbook and the journal paper are defined independently in the machine. Under the existing circumstances, therefore, the machine cannot help being large-sized, and the printing mechanism is complicated in structure and uneconomical.

A prior art registering terminal apparatus as shown in FIG. 1, for example, is installed in each branch office of a bank or some other financial agency. Account transaction information for a passbook to undergo registering are called out by on-line communication with a central computer located in an office management center, and printed on the passbook and a journal paper.

Referring now to the drawing of FIG. 1, there are shown a passbook a, a record document b other than a passbook, such as a journal paper for duplication, a platen c for the printing of the passbook a, a platen d for the journal paper b, a carriage e moving in parallel with the platens c and d, and a printing head f, e.g. a type-wheel.

As may be seen from FIG. 1, the platens c and d are provided separately, so that the apparatus naturally becomes wide. Namely, a width l is so large that the apparatus requires a very wide setting space in the business office.

The prior art apparatus using passbooks involves further problems. If the last column on a double-spread page of a passbook inserted in the apparatus is reached and further entry is needed while the passbook is undergoing the printing operation, the passbook is once returned to the user. Then, the user turns over a leaf to get the next page, and inserts it again into the apparatus for continued printing.

When the passbook is once returned, however, an unaccustomed user might discontinue the operation on the apparatus in spite of his being in the middle of the registering operation, coming to a hasty conclusion that the transaction is over. Then, the user who has suspended the operation would not be able to perform registering of the remaining informations, and besides a user next to him would unknowingly insert his passbook to start his due transaction, but in vain.

In order to prevent such trouble, it is necessary that the passbook once inserted in the apparatus should not be returned to the user before all the transaction information is printed on the passbook. To attain this, there is a demand for a page turning mechanism which enables automatic turning of the leaves of the passbook within the apparatus.

SUMMARY OF THE INVENTION

The object of this invention is to provide a banking apparatus using passbooks which eliminates the above-mentioned various defects of the prior art apparatus, provides reduction in size, and can prevent users from making wrong operations.

Such object of this invention may be attained as follows.

Namely, in a printing apparatus of this invention, a single platen is disposed in a printing position defined in a passbook path, and a journal paper for the duplication of transaction information normally lies on the platen. In passbook printing, a passbook is put on the journal paper on the platen, and subjected to printing as required. Then, in journal printing, the passbook is removed from the platen. Setting of the passbook on the platen, the time for removing the passbook from the set position, and the time for the start of printing are all controlled electrically.

In an automatic depositing machine including the above-mentioned printing apparatus, there is provided a mechanism for turning the leaves of the passbook. This page turning mechanism is disposed in the passbook path, preferably near the printing apparatus.

Basically, the pass turning mechanism of the invention includes friction rollers pressed against the passbook with its leaves spread out, clamp means for rigidly holding the passbook spaced from the rollers, and retaining pins penetrating between the uppermost leaf of the opened passbook, which is partially lifted by the rotation of the friction rollers, and a leaf following the uppermost leaf left unturned.

Preferably, the clamp means holds the leaf of the opened passbook on one side by a portion near the binding edge, and the friction rollers are pressed against a marginal portion of the same leaf. Such arrangement ensures secure single-page turning.

BRIEF DESCRIPTION OF THE DRAWINGS

FIG. 4(a) is a perspective view of the passbook which is opened showing the cover side thereof, while FIG. 4(b) is a perspective view showing the inside;

Figure 1:
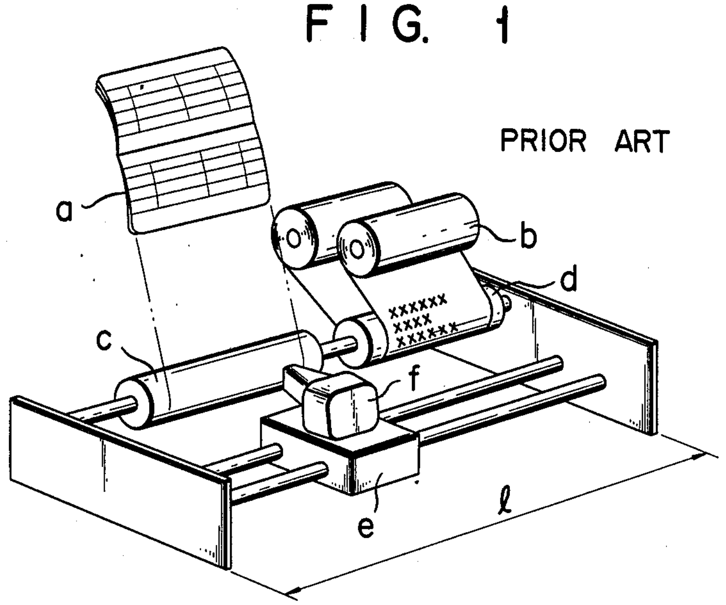
FIG. 1 is a schematic perspective view of a prior art passbook printing terminal apparatus.

Referring now to the drawings of FIGS. 2 to 19, there will be described embodiments of this invention.

DETAILED DESCRIPTION OF THE PREFERRED EMBODIMENTS

Figure 2:
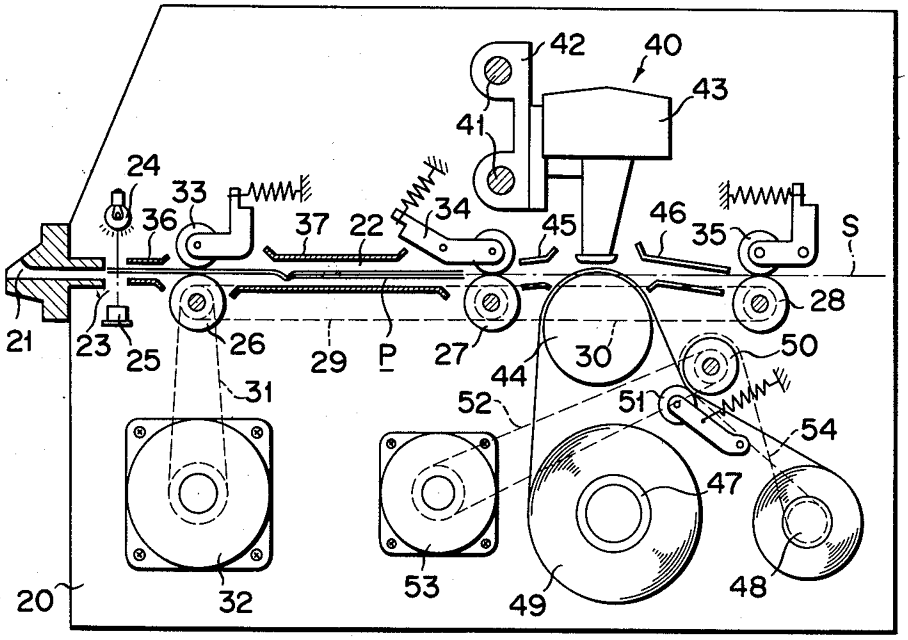
FIG. 2 is a profile of a registering terminal machine incorporating a basic printing apparatus using passbooks according to this invention.

In a passbook registering terminal machine 20 with a built-in basic printing apparatus of this invention as shown in FIG. 2, the front and rear sides of the machine correspond to the left- and right-hand sides of the drawing, respectively. Since FIG. 2 shows the printing apparatus section of the terminal machine, the machine will be referred to as the printing apparatus so far as the description of FIG. 2 is concerned. An inlet 21 to receive a passbook P is defined at the forward end portion of the printing apparatus. The passbook P, opened with the entry side upward, is inserted into the apparatus through the inlet 21. The passbook P is of a style as shown in FIGS. 4(a) and 4(b), for example.

In the apparatus, there is defined a substantially straight passbook path 22 with one end connected to the inlet 21 and extending toward the rear side.

Just inside the inlet 21 is an optical detector 23 disposed across the path 22. The detector 23 is composed of a light source 24 and a light sensor 25.

Driving rollers 26, 27 and 28 are rotatably arranged in a position immediately behind the detector 23, a substantially middle position, and a position near the rear end, respectively, along the path 22, endless timing belts 29 and 30 being stretched between these rollers. The front-side driving roller 26 is connected to a driving pulse motor 32 by means of an endless belt 31. The motor 32 is of a reversible type. The motor, endless belts and driving rollers constitute a conveyance means for the passbook P.

The three driving rollers 26, 27 and 28 are pressed by spring-biased pinch rollers 33, 34 and 35, respectively. The combined arrangements of the driving rollers and their corresponding pinch rollers form a means for holding and feeding the passbook P.

Respectively between the detector 23 and the front-side driving roller 26 and between the roller 26 and the intermediate driving roller are paired upper and lower horizontal guide plates 36 and 37 disposed in parallel with one another along the path 22, defining a narrow passage to guide the passbook P.

A printing mechanism 40 is disposed in a printing position between the intermediate driving roller 27 and the rear-side driving roller 28. The printing mechanism 40 is composed of a carriage 42 to slide on a pair of guide rails 41, 41, a printing head 43 mounted on the carriage, and a cylindrical platen 44 facing and disposed below the head 43.

As may be seen from FIG. 2, the platen 44 partially invades the path 22 and appears above a base line S of the path 22, that is, a line passing through the nip points between the driving rollers and the pinch rollers.

Paired upper and lower parallel guide plates 45 and 46 are disposed in the front and rear sides of the platen 44, respectively. These paired guide plates 45 and 46 are ascendingly inclined toward the platen 44.

A journal paper 49 extending from a rewinding reel 47 to a take-up reel 48 is partially wound around the platen 44.

The journal paper 49 is always wound round the platen 44 during the operation of the apparatus. The paper 49 may be replaced with a slip or card form for transaction memos.

The journal paper 49 is held between a feed roller 50 and a pinch roller 51 which is spring-biased to be pressed against the roller 50, and is fed by means of the rotation of the roller 50. The roller 50 is connected to a driving pulse motor 53 by means of an endless belt 52, and also to the take-up reel 48 by means of another endless belt 54. Therefore, the roller 50 is driven and rotated by operating the motor 53, and the journal paper 49 is fed intermittently in the winding direction.

The motor 53, endless belt 52, feed roller 50 and the pinch roller 51 constitute a feed mechanism for the journal paper.

Figure 3:
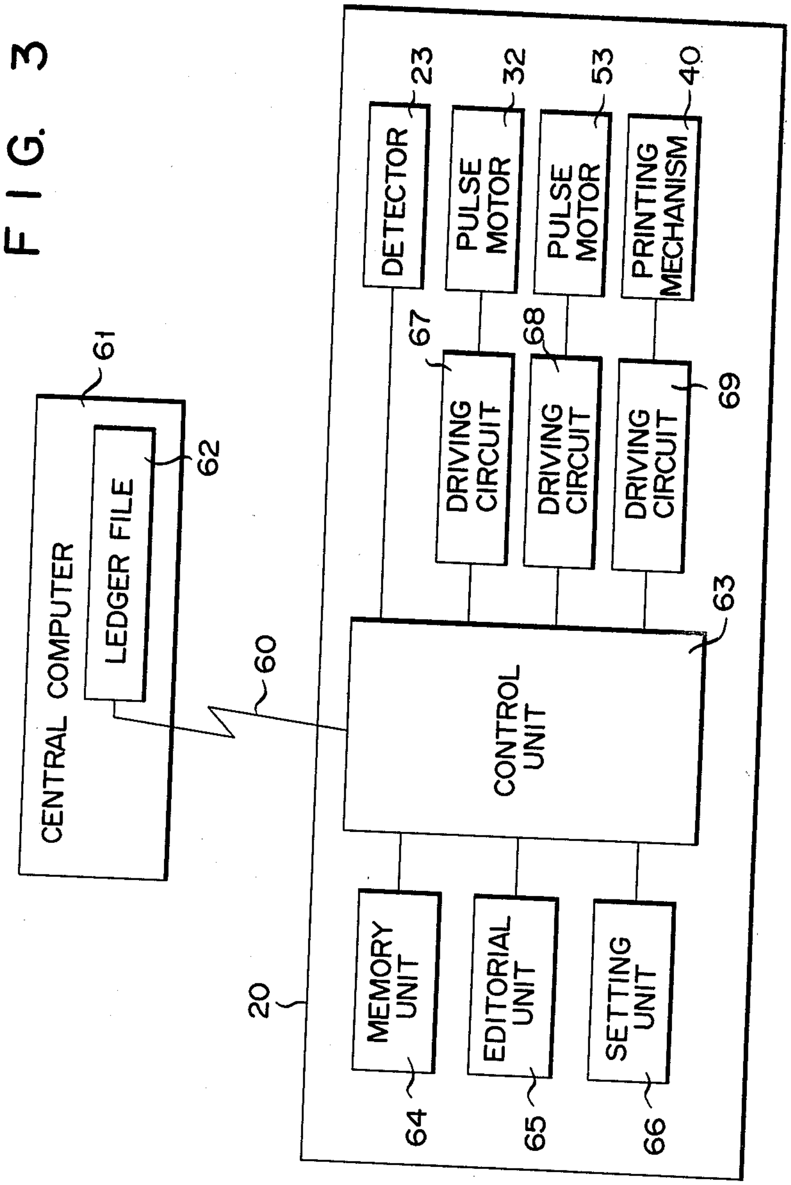
FIG. 3 is a control block diagram of an on-line system using the terminal machine of FIG. 2.

FIG. 3 shows a system in which the terminal machine 20 of this invention is on-line-connected with a central computer 61 by means of a communication circuit 60. In the central computer 61 is a ledger or master file 62 storing transaction record or information for each account. In the terminal machine 20 is a control unit 63 for controlling the whole circuit of the machine. The control unit 63 is connected with a memory unit 64 to store printing information transmitted from the central computer 61, an editorial unit 65 for editing the printing information stored in the memory unit 64 in compliance with the forms of the passbook and the journal paper, a setting unit 66 for setting the initial line on the passbook, a driving circuit 67 for controlling the detector 23 and a passbook feed driving system, a driving circuit 68 for controlling a journal paper feed driving system, and a driving circuit 69 for controlling the printing mechanism 40.

Referring to the drawings of FIGS. 2 and 3, there will now be described the printing operation of the printing apparatus of the terminal machine which has the above-mentioned construction.

Figure 4:
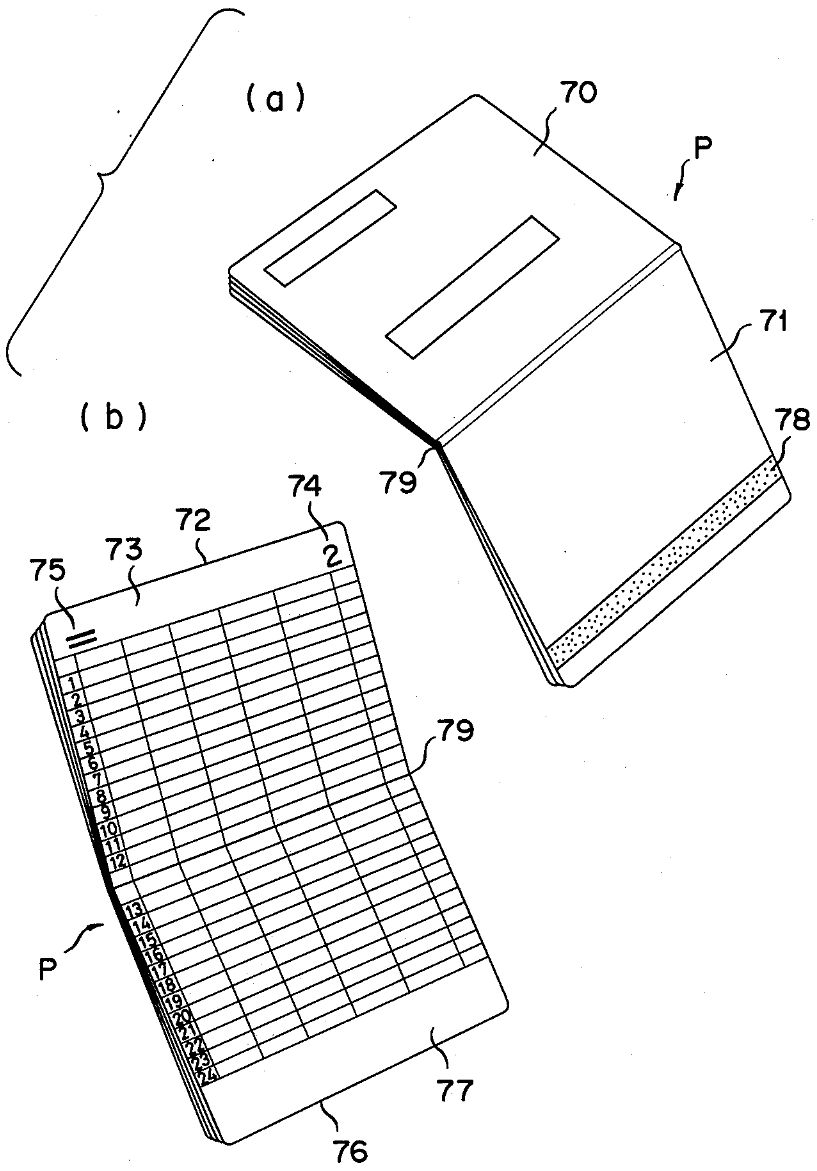
FIGS. 4(a) and 4(b) show a passbook suited for the use with the apparatus of this invention.

As shown in FIGS. 4(*a*) and 4(*b*), the passbook P as a record document used here is a booklet in which a plurality of printing leaves are sandwiched between a front cover 70 and a back cover 71, and bound at a binding edge 79. A plurality of printing columns (24 columns in FIG. 4) are printed on each double-spread page.

On a forward or leading edge 72 side of the double-spread page is a margin 73 on both sides of which a page number 74 and a black bar mark 75 for optical reading corresponding to the page number are printed, respectively.

On the rear or trailing edge 76 side of the double-spread page, on the other hand, is a relatively wide non-printed margin 77.

Moreover, a transverse magnetic stripe 78 is stuck to the back cover 71 of the passbook P. An account number, deposit balance and other printing information required are magnetically written in the magnetic stripe 78.

Figure 6:
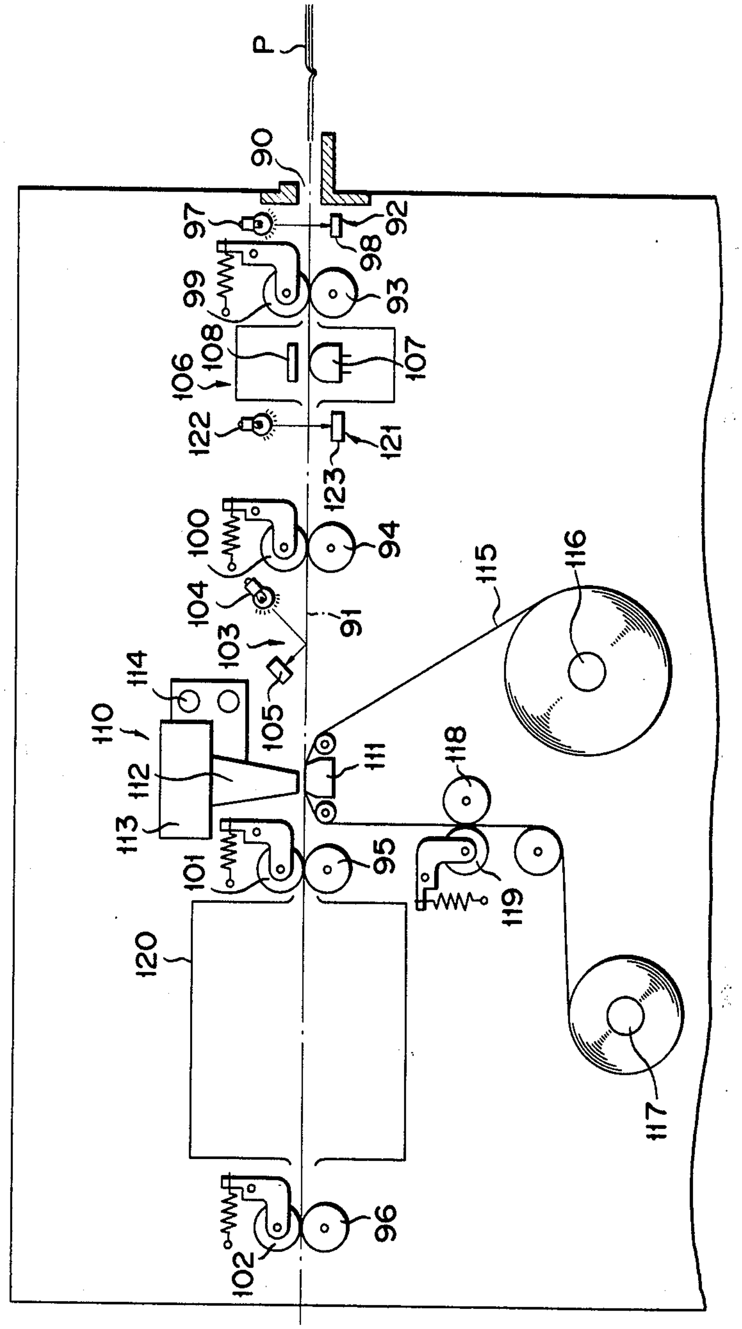
FIG. 6 is a schematic view of a printing system built in the automatic depositing machine of FIG. 5, in which a page turning mechanism is shown merely as a block.

The magnetic stripe 78 and bar mark 75 of the passbook P, however, are not used with the terminal machine 20, but are used with a printing apparatus of an automatic depositing machine according to another embodiment as shown in FIG. 6.

The passbook P is opened at a page to be printed and held with the entry side or printing side upward when it is inserted into the apparatus through the inlet 21 by an user, e.g. a bank clerk in charge.

The detector 23 detects the leading edge 72 of the inserted passbook P, and supplies an "ON" signal to the control unit 63. The control unit 63 immediately gives an order to the driving circuit 67 to actuate the pulse motor 32. As a result, the three driving rollers 26, 27 and 28 are rotated clockwise, and the passbook P is transferred.

When the trailing edge 76 of the passbook P has passed through the detector 23, the detector 23 supplies an "OFF" signal to the control unit 63. In response to the "OFF" signal, the control unit 63 reverses the pulse motor 32 by means of the driving circuit 67. Thus, the passbook P is returned toward the inlet 21 to cause the trailing edge to cross the detector 23. The moment said trailing edge passes the detector 23, the detector 23 supplies the "ON" signal to the control unit 63. After receiving the "ON" signal, the control unit 63 reverses the pulse motor 32 as it is, for a predetermined number of pulses, and then stops the motor 32.

Thus, the passbook P stops at the position of FIG. 2 where it crosses the detector 23. This position is regarded as the base position. In the meantime, the detector 23 goes on delivering the "ON" signal.

The above-mentioned sequential operations are performed in accordance with a sequence program stored in the control unit 63.

Subsequently, necessary transaction information is stored in the memory unit 64 immediately when they are transmitted from the central computer 61. The stored information is supplied under the control of the control unit 63 to the editorial unit 65, where they are classified into two types; information to be printed on the passbook P and information to be printed on the journal paper 49. At the same time, this information is so arranged as to comply with the printing modes corresponding to their types, e.g. the number of printed letters per line. Thereafter, the arranged information is stored again in the memory unit 64. After completion of such storage, a signal is supplied from the editorial unit 65 to the control unit 63, and a printing operation is started.

First, printing for the journal paper 49 is performed. Before this step is executed, the control unit 63 confirms the "ON" signal from the detector 23. If the "ON" signal is found to be supplied from the detector 23, the control unit 63 gives the driving circuit 69 in order to read out only the printing information for the journal paper 49 from the memory unit 64 and to print the information on the successive lines.

When printing for one line is finished, the pulse motor 53 is driven by means of the driving circuit 68 to make intermittent feed of the journal paper 49 to reach another line. Such operation is repeated to accomplish the printing on the journal paper 49. Here the journal paper 49 is left wound round the platen 44.

The control unit 63 drives the pulse motor 32 to advance the passbook P intermittently so that the printing head 43 may face the proper line on the passbook set by the setting unit 66.

Namely, a necessary number of pulses are delivered from the driving circuit 67 until the printing line set by the setting unit 66 is placed on the platen 44, more specifically on the journal paper wound round the platen, and comes just to face the printing head 43.

Thus, the passbook P is located accurately in the printing position on the platent 44, and stopped as it is. Immediately, the control unit 63 reads out the information required only for the passbook from the memory unit 64, and drives the printing head 43 to perform printing for each line. In the meantime, the pulse motor 32 is also actuated to move the passbook intermittently with every line on the platen.

The passbook P on the platen 44 is opened with the leaves on both sides of the double-spread page spread out at an angle of 180° or more about the central binding line, since the platen 44 partially appears above the base line S of the path 22 and that both sides of the spread page are pressed down respectively by the paired guide plates 45 and 46 in front and in back of the platen. Accordingly, the surface of the leaf to be printed is strained to eliminate dog-ears, if any, thereby securing satisfactory printing.

When the printing is completed, the pulse motor 32 is reversed, and the passbook P is returned toward the inlet 21. When the passbook P has passed through the detector 23, the detector 23 supplies the "OFF" signal to the control unit 63. Then, the control unit 63 is prohibited from any mechanisms, and the printing operation is finished.

Referring now to FIGS. 5 to 10, there will be described another embodiment of this invention applied to an automatic depositing machine.

Figure 5:
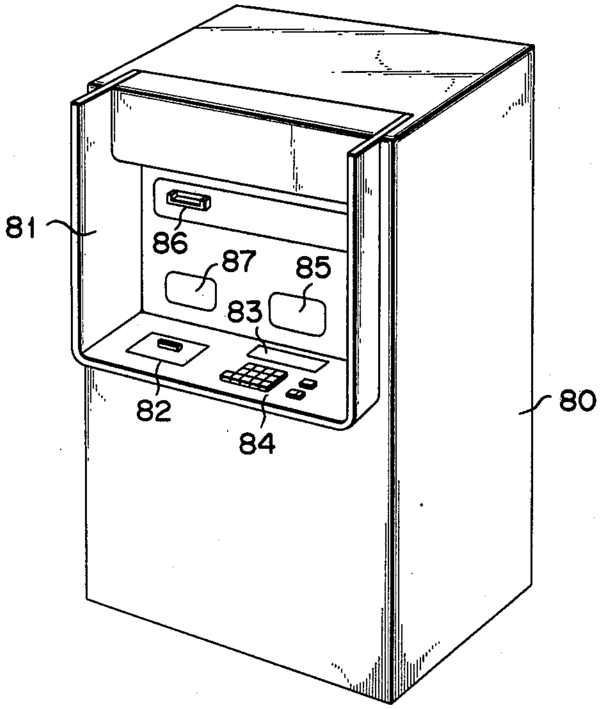
FIG. 5 is a perspective exterior view of an automatic depositing machine embodying this invention.

FIG. 5 shows an exterior view of an automatic depositing machine 80, in which a cash inlet 82 to receive money, an operation guide display unit 83 successively displaying phrases to indicate operating instructions for users, and control keys 84 are arranged on the horizontal surface of a control panel 81. On the vertical surface of the panel, on the other hand, there are arranged an amount display board 85, a passbook inlet 86, and a cash return outlet 87.

A passbook printing apparatus built-in the depositing machine 80 is of a construction as shown in FIG. 6.

In the printing apparatus, there is defined a substantially straight passbook path 91 with one end connected to a passbook inlet 90. In FIG. 6, the front and rear sides of the apparatus correspond to the right- and left-hand sides of the drawing.

The passbook P used is the same one as shown in FIG. 4. When the passbook P is inserted through the inlet 90, opened with its double-spread page upward, the forward or leading edge 72 of the passbook P is detected by an optical detector 92 disposed right behind the inlet 90. A detection signal is delivered from the detector 92, and driving rollers 93, 94, 95 and 96 are driven and rotated counterclockwise by a pulse motor (not shown). The detector 92 is composed of a light source 97 and a light sensor 98. The driving rollers 93 to 96 are arranged at intervals along the path 91. These driving rollers are pressed respectively by spring-biased pinch rollers 99, 100, 101 and 102. The passbook P is held between and carried by the driving rollers and their corresponding pinch rollers. The distance between each two adjacent driving rollers is shorter than the spread length of the passbook P.

Substantially in the middle of the path 91 is a mark detector 103 consisting of a light source 104 and a light sensor 105. The detector 103 optically reads the bar mark 75 (FIG. 4) on each page of the inserted and transmitted passbook P.

In the path 91 is a read/write unit 106 disposed in back of the detector 92. The unit 106, which reads informations from the magnetic stripe 78 (FIG. 4) of the inserted passbook P and writes new information in the stripe, is composed of a magnetic transducing head 107 for scanning the surface of the magnetic stripe 78 in close contact therewith and a presser plate 108 to press the magnetic stripe of the passbook against the head 107.

At the back of the mark detector 103 is a printing mechanism 110 disposed in the path 91. The printing mechanism 110, which is of substantially the same construction as the one shown in FIG. 2, is characterized by its platelike platen 111. Above the platen 111 faces a printing head 112 at the upper portion, a carriage 113 bearing the head, and guide rails 114 slidably guiding the carriage. The facing position of the head 112 and the platen 111 is defined as a printing position.

A journal paper 115 is stretched between a rewinding reel 116 and a take-up reel 117 across the platen 111. The journal paper 115 is held at the middle thereof between a feed roller and a spring-biased pinch roller 119 opposite thereto. Like the construction of FIG. 2, the feed roller 118 is driven intermittently by a pulse motor (not shown) separate from the one for the passbook conveying system.

Right behind the printing mechanism 110 is a page turning mechanism 120 for turning over the leaves of the passbook P, which is disposed across the path 91. The details of the mechanism 120, which are shown in FIGS. 7 and 8, will be described later.

Just at the back of the read/write unit 106 is another optical detector 121 composed of a light source 122 and a light sensor 123. The detector 121 generates a detection signal for correctly locating the passbook P in a proper position of the read/write unit 106 and in the printing position of the printing mechanism 110.

Figure 7:
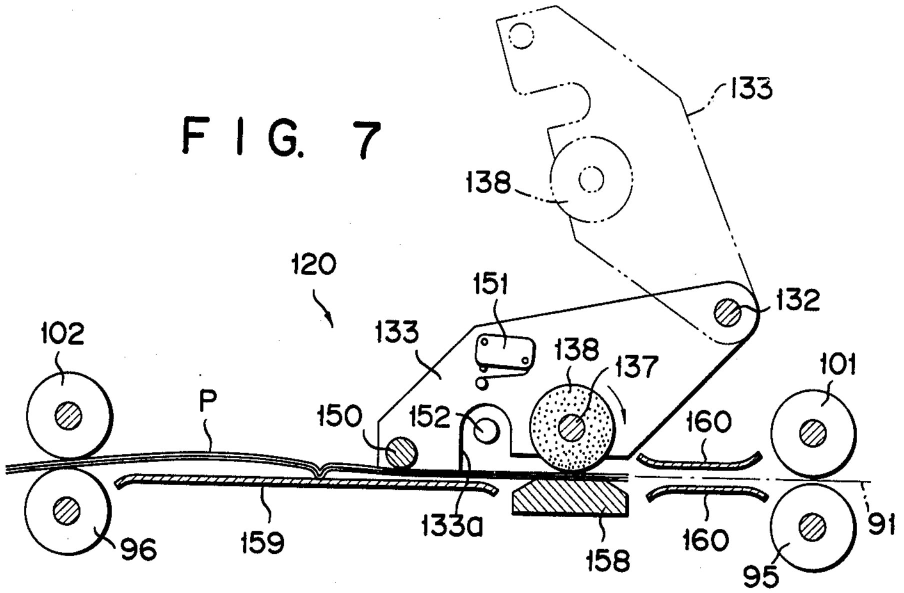
FIG. 7 is an enlarged view of the page turning mechanism built in the printing system of FIG. 6.
Figure 8:
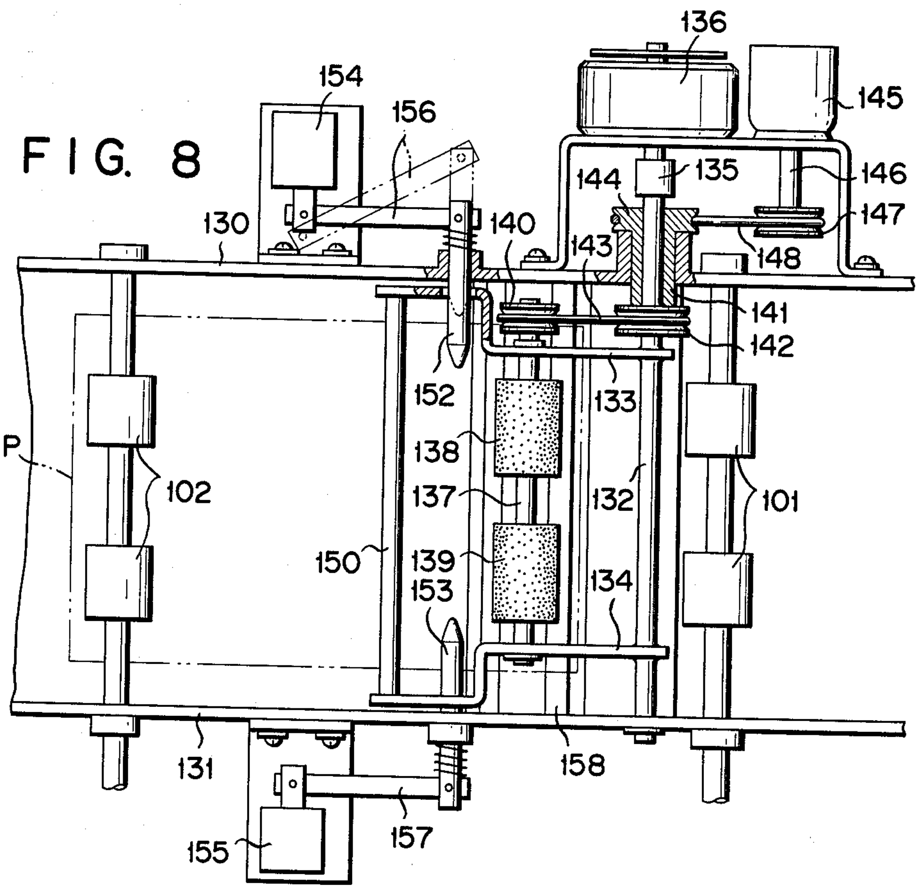
FIG. 8 is a top view of the mechanism of FIG. 7.

In the page turning mechanism 120 shown in FIGS. 7 and 8, fixed parallel frames 130 and 131 extend along the longitudinal direction of the path 91. A pair of spaced arms 133 and 134 are rigidly fixed on a shaft 132 which is rotatably supported by the frames 130 and 131. The shaft 132 is fitted at its extended end with a rotary solenoid 136 by means of a coupling 135. By the operation of the solenoid 136, the arms 133 and 134 are allowed to rock between a clamp position indicated by full line of FIG. 7 and a stand-by position indicated by chain line. Namely, the arms 133 and 134 are in the clamp position when the solenoid 136 is energized, while they are returned to the stand-by position when the solenoid 136 is deenergized.

The paired arms 133 and 134 rotatably bear a shaft 137, on which a pair of rollers 138 and 139 made of a material with high coefficient of friction are rigidly fixed at a space from each other between the arms 133 and 134. A pulley 140, which is fixed to the extended end of the shaft 137, is connected by means of a belt 143 wih a pulley 142 fixed to one end of a sleeve shaft 141 which is rotatably mounted on the shaft 132. A pulley 144 fixed to the other end of the sleeve shaft 141 is connected by means of a belt 148 with a pulley 147 mounted on a shaft 146 of a motor 145. By the operation of the motor 145, therefore, the friction rollers 138 and 139 are rotated in the direction of an arrow of FIG. 7.

A rod like retaining member 150 is fixed between the respective free ends of the paired arms 133 and 134. Further, the arm 133 is fitted with a detecting element 151 formed of a microswitch, as shown in FIG. 7.

Support pins 152 and 153 with pointed tips are withdrawably supported by the frames 130 and 131, respectively, extending across the longitudinal direction of the path 91. The two support pins 152 and 153, facing each other, are located between the friction roller 138 and the retaining member 150, as shown in FIG. 7. Each arm 133 or 134 is provided with an undercut notch 133a to allow the movement of the support pin 152 or 153.

The support pins 152 and 153 are connected to solenoids 154 and 155 by means of links 156 and 157, respectively. When the solenoids 154 and 155 are de-energized, the support pins 152 and 153 are in projected positions as represented by full line in FIG. 8. On the other hand, when the solenoids are energized, the pins are brought to retreated positions as represented by chain line for the pin 152 on one side, getting out of the region as represented also by chain line in FIG. 8 where the passbook P is located.

An anvil member 158 is disposed below the friction rollers 138 and 139 to correspond thereto, and is fixed to the frames 130 and 131 on both sides. A wide support plate 159 is disposed between the anvil member 158 and the rear-side driving roller 96, and fixed to the frames 130 and 131. Also, paired upper and lower guide plates 160 are disposed between the anvil member 158 and the front-side driving roller 95, and fixed to the frames 130 and 131.

The set position of the passbook P for paging is as represented by full line in FIG. 7 and chain line in FIG. 8. In this position, a portion near the edge of a leaf on one side of the double-spread page is held between the friction rollers 138 and 139 and the stationary anvil 158. This portion of the leaf corresponds to the non-printed margin 77 as shown in FIG. 4(b). As for the retaining member 150, it is located on a portion near the binding edge 79 of the passbook P on the same side, thereby clamping the passbook P in cooperation with the stationary support plate 159. Namely, the retaining member 150 and the stationary support plate 159 constitute a clamp means.

The passbook P is brought to the set position from the right of FIG. 7 along the path 91. The stop at the set position may easily be decided by the distance from the detector 121 (FIG. 6) and the number of pulses from a passbook conveying pulse motor (not shown).

After the passbook P is located in the set position, the rotary solenoid 136 is energized to rock the arms 133 and 134 from the stand-by position to the clamp position, thereby providing the full-line position or state of FIG. 7. Keeping the rotary solenoid 136 energized, the motor 145 is operated to turn the friction rollers 138 and 139 in the direction of the arrow of FIG. 7 (clockwise).

Figure 9A:
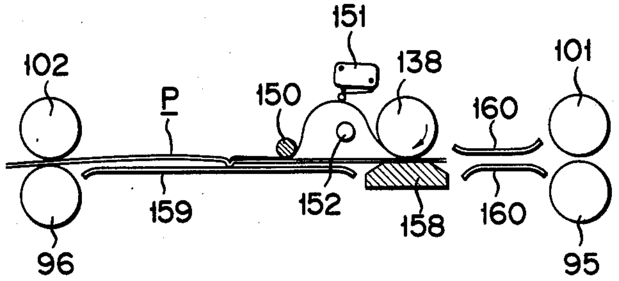
FIGS. 9(a), 9(b) and 9(c) are explanatory drawings for illustrating a series of page turning operations of the page turning mechanism of FIG. 7.

Then, the friction rollers 138 and 139 incurvates only the uppermost leaf of the passbook P pressed thereby, as shown in FIG. 9(a), thereby achieving partial turning over of the leaf. In this state, the retaining member 150 constituting the clamp means fully keeps the leaves of the passbook from moving.

When the uppermost leaf is curved largely accompanying the rotation of the friction rollers 138 and 139 to have its top face push the microswitch 151, a signal to tell the completion of the partial turning of the uppermost leaf is delivered, and the rotation of the friction rollers 138 and 139 is stopped. Moreover, accompanying the energization of their corresponding solenoids 154 and 155, the paired support pins 152 and 153 are projected crosswise from the retreated positions, penetrating between the uppermost leaf and unturned leaves thereunder.

Figure 9B:
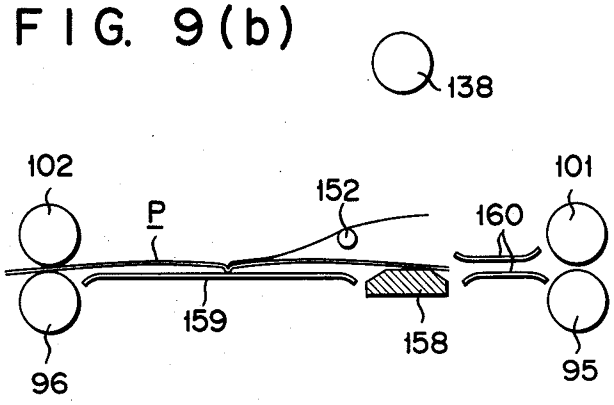

Then, the arms 133 and 134 are rocked to the stand-by position, and the friction rollers 138 and 139 and the retaining member 150 are removed from the passbook P. Thereupon, as shown in FIG. 9(b), the uppermost leaf of the passbook P is sustained by the support pins 152 and 153 to be held partially turned.

Figure 9C:
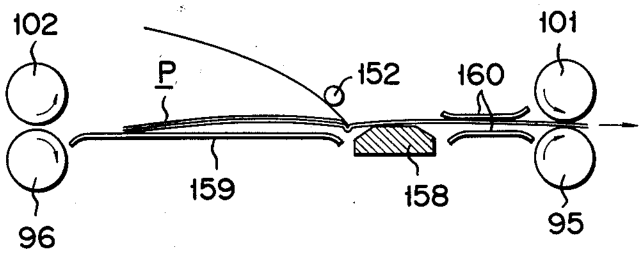

Subsequently, the driving rollers 95 and 96 are reversed in the clockwise direction as indicated by curved arrows of FIG. 9(c), and the passbook P is carried in the return direction as indicated by a straight arrow of FIG. 9(c). Then, the uppermost leaf falls down on the leaf on the opposite side because of the existence of the projected support pins 152 and 153. Thus, the entire process of turning over a leaf is completed. Thereafter, accompanying the deenergization of the solenoids 154 and 155, the support pins 152 and 153 are returned to the retreated positions by a spring action, leaving the passage region of the passbook.

Figure 10:
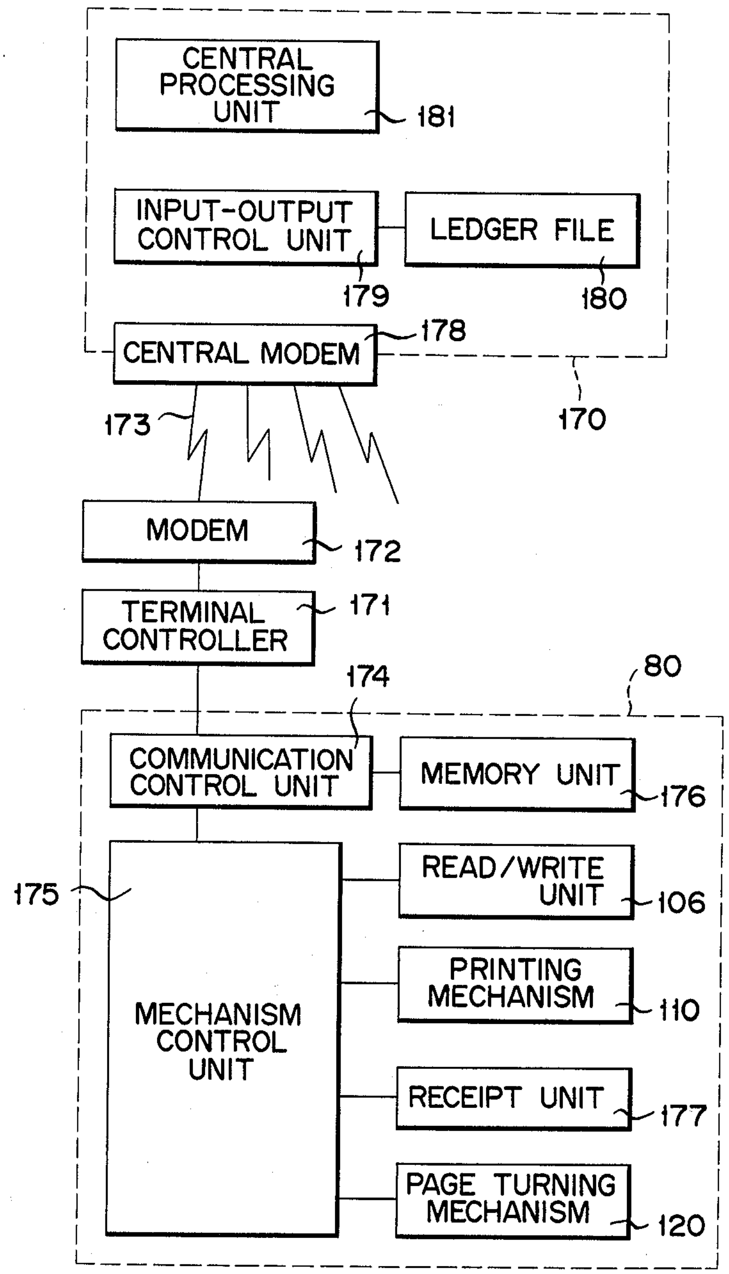
FIG. 10 is a control block diagram on an on-line system employing the automatic depositing machine of FIG. 5.

FIG. 10 is a block diagram showing the automatic depositing machine 80 of FIG. 6 and a center system 170 connected in an on-line system.

Although FIG. 10 shows an automatic depositing machine 80 as an example, a plurality of depositing machines are connected to a terminal controller 171, actually. The controller 171 is connected to the remote center system 170 by means of a modem 172 and a communication line 173.

The depositing machine 80 includes a communication control unit 174 for controlling the communication in regard to the transfer of information between the machine 80 and the center system 170, a mechanism control unit 175 for controlling various internal mechanisms, a memory unit 176 storing the printing information transmitted from the center system 170 after classifying them into two types, i.e. informations for the passbook and ones for the journal paper, and arranging them in compliance with their corresponding printing forms, and additionally a receipt unit 177 to manage deposits received in the depositing machine.

On the other hand, the center system 170 is composed of a central modem 178 to perform combined communication with other transaction apparatus, an input-output control unit 179 for controlling the transfer of information in- and outside the system, a ledger or master file 180 as an external memory unit capable of storing, reading and writing the transaction information of users for their respective account numbers, and a central processing unit 181 for controlling those units.

Now there will be described the passbook handling operation by the use of the above-mentioned automatic depositing machine.

First, the upper opens the passbook P for his appropriate deposit account at the up-to-date page, and inserts the passbook into the inlet 90. The account number, the first column number on the passbook for the next spell of printing, etc. are recorded as magnetic informations in the magnetic stripe 78 of the passbook P.

The leading edge 72 of the inserted passbook P is detected by the detector 92, the driving rollers 93 to 96 are rotated by the signal from the detector 92, and the passbook P is brought to the mark detector 103. Thereupon, when the bar mark 75 on the passbook is detected by the mark detector 103, the rotation of the driving rollers is stopped by the mark detection signal from the detector 103.

Where the passbook P is in such stop position, the magnetic stripe 78 on the passbook P corresponds to the reading position of the read/write unit 106. Here the mark detection signal induces the read/write unit 106 to perform reading operation.

If the mark detector fails to detect the mark within a predetermined period of time because of, e.g., inverted or reverse insertion of the passbook, the passbook will be returned to the inlet 90.

Now let it be supposed that the passbook P is already printed with letters up to the 20th column of the second page (FIG. 4) as a result of transactions of the past.

Data read out from the magnetic stripe 78 are compared with the output data of the mark detector 103 at the mechanism control unit 175. If they are consistent, the passbook P is stopped where the 21st column of the second page is brought to the printing position. If not so, then the passbook P is returned to the inlet 90.

If the identify of the passbook P is verified, the cash inlet 82 (FIG. 5) is uncovered. Then, the user puts his bank notes for deposit into the opened cash inlet 82, and covers the inlet. In response to such operation, the receipt unit 177 starts, examining the genuineness of the notes and displaying the total amount on the amount display unit 85. Unidentifiable notes are returned to the user through the return outlet 87.

The automatic depositing machine 80 communicates with the center system 170 by means of the communication line 173, and the renewal of the ledger file 180 of the center system 170 and typing on the passbook P in accordance with the ledger file are performed automatically by the printing mechanism 110 of the automatic depositing machine 80.

The receipt amount and the information read from the passbook are transmitted to the center system 170 via the communication control unit 174, terminal controller 171, modem 172, and the communication line 173. The center system 170 reads out the proper account from the ledger file 180 in accordance with the received information, and compares the received information with the entry in the passbook and transaction records for the account.

Further, the ledger file 180 is renewed, and the printing information is transmitted to the depositing machine 80. The printing information is stored in the memory unit 176 as the printing data for the passbook P and the data for the journal paper 115, for each predetermined number of columns or lines, and the printing mechanism 110 performs printing operation with every column in accordance with the stored data. In the meantime, the passbook P is advanced intermittently for printing feed.

When the printing is finished, the passbook P is returned to the inlet 90 along the path 91.

In the process of the passbook return, the passbook is once stopped at the read/write unit 106, where up-to-date information including the number of the finally printed column are magnetically written in the magnetic stripe 78.

While the passbook P is staying in the read/write position, the mark detection signal is generated from the detector 103, and transmitted immediately to the mechanism control unit 175. In response to the transmitted signal, the control unit 175 rotates the feed roller 118 for the journal paper device. At the same time, the printing information for the journal paper 115 are transmitted from the memory unit 176 to the printing mechanism 110 through the mechanism control unit 175, and letters are printed on the journal paper 115. During such printing operation, the journal paper is driven intermittently column by column.

Thus, in the same printing position, printing is performed first for the passbook, and then for the journal paper. Accordingly, the printing apparatus of this invention requires only a single platen, so that the great width of the prior art apparatus as shown in FIG. 1 may be avoided, and that there may be provided compact structure.

Meanwhile, if further printing is needed for the passbook P after the last or 24th column on the current page is reached, the passbook is transferred from the printing position to the aforementioned page turning mechanism 120, according to this invention. In the page turning mechanism 120, one leaf of the passbook P is turned over, and then the passbook P is returned to the printing position for continued printing.

Thus, including the page turning mechanism, the automatic depositing machine with the printing apparatus of the invention need not once return the passbook to the user even if page turning is required during the printing operation. Namely, page turning is performed by the page turning mechanism 120 in the machine before the passbook registering is finished. The passbook is returned to the user through the inlet 90 only when the transaction is completed. Thus, the user will never be induced to misunderstanding or wrong operation.

According to this invention, moreover, separate driving systems are used for the passbook conveying system and the journal paper feed system, and the journal paper cannot be printed until the position of the transferred passbook is confirmed, thereby ensuring the smooth and accurate printing operations for both passbook and journal paper.

Figure 11:
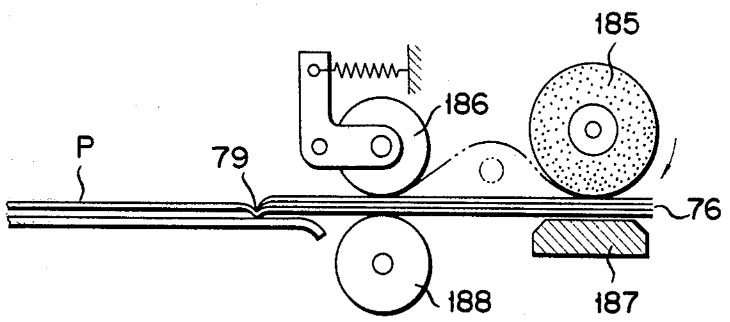
FIG. 11 shows a partial modification of the page turning mechanism of FIG. 7.
Figure 12:
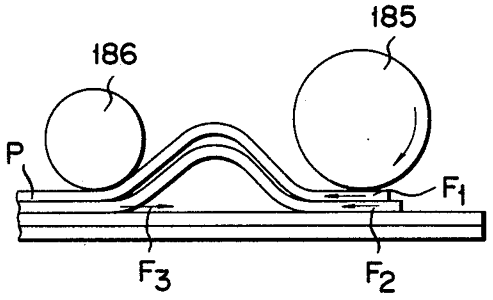
FIG. 12 is an explanatory drawing for illustrating the operating principle of the page turning mechanism of FIG. 11.

FIGS. 11 and 12 diagrammatically show the basic arrangement of the aforementioned page turning mechanism according to this invention. One of the advantages of the page turning mechanism of the invention lies in that a rotary friction roller 185 and a pressing member 186 are located on a succeeding one-side leaf of the travelling opened passbook which is set in the page turning position. The friction roller 185 holds that portion of said succeeding leaf which lies near the trailing edge 76, in cooperation with a stationary anvil member 187 facing the roller 185 from below. The pressing member 186 clamps that portion of the succeeding leaf which lies near the binding edge 79, in concert with a roller member 188 facing the pressing member 186 from below.

$F_1$ is a frictional force in the turning direction which is applied to the uppermost leaf in touch with the friction roller 185 by a clockwise rotation of the roller 185, and $F_2$ is a friction force in the turning direction which is applied to the leaf following the uppermost leaf through the same. On the other hand, $F_3$ is a bending stress of paper which is generated at portions of leaves clamped by the pressing members 186 and 188, and acts as reaction force against the turning forces $F_1$ and $F_2$.

According to this invention, the coefficient of friction of the friction roller 185 and the pressure given by the pressing member 186 are so set as to obtain relations $F_1>F_3>F_2$. Thus, the second uppermost leaf may positively be prevented from being turned over together with the uppermost leaf. This can be achieved because the considerably large bending stress $F_3$ is generated as the reaction force at the leaves by the pressing member 186.

If the leaf is turned only by the offered friction roller, without utilizing the favorable clamping effect offered by the upper and lower pressing members 186, 188 as is observed in the page turning mechanism of this invention, then the leaf will be turned around the binding edge, so that there will not be produced any substantial bending stress as the reaction force. As a result, the problem of double or triple page turning cannot positively be obviated.

Although the upper and lower pressing members 186 and 188 as the clamp means shown in FIG. 11 are of roller type, they may be replaced with a combination of the rodlike member 150 and the support plate 159 as shown in FIG. 7 or any other suitable structure.

Further, the friction roller 185 is pressed against the marginal region of the one-side leaf of the passbook. Thereupon, by leaving the marginal region 77 as a non-printed region, like the case of the passbook P shown in FIG. 4(*b*), the letters on the leaf will never be blurred by the friction between the roller and the leaf. Moreover, the area of such region takes up considerably low a percentage of the gross area of the leaf to involve any problems.

FIGS. 13 to 19 show an embodiment of the automatic depositing machine with a passbook printing apparatus which includes a two-way page turning mechanism according to this invention.

In this depositing machine, there is provided a page turning mechanism which can turn over the leaves of an inserted passbook in either direction. The use of such mechanism brings a solution to the following problem. That is, a user might insert his passbook opened at a wrong page into the depositing machine, requiring a leaf of the passbook to be turned over in the opposite direction within in the machine. Otherwise, a plurality of leaves might be turned over at a time by mistake during forward page turning, requiring the additional leaf or leaves to be returned in the reverse direction.

Figure 13:
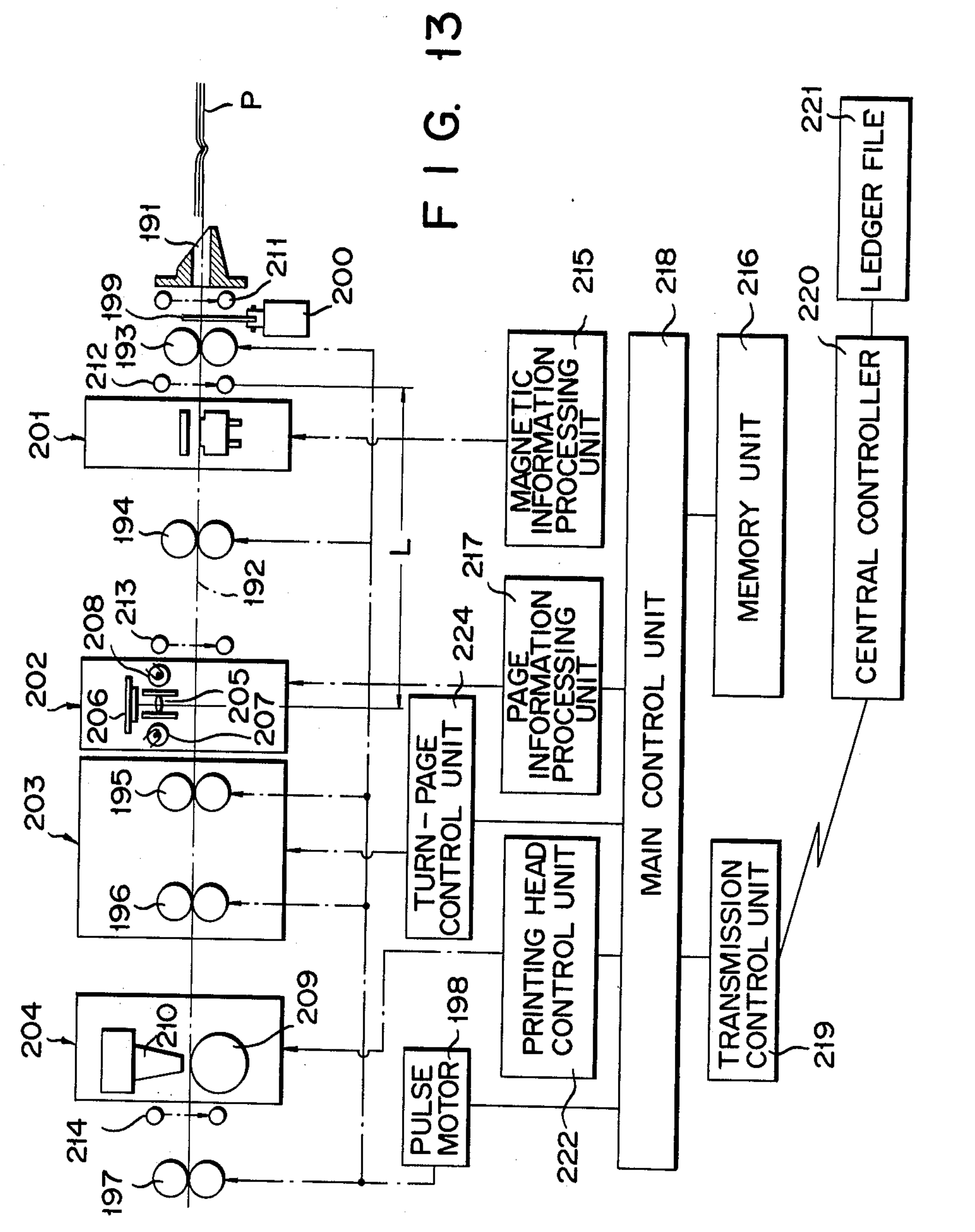
FIG. 13 is a schematic view showing a printing system which is built in the automatic depositing machine and includes a mechanism capable of two-way page turning, as well as control systems in blocks.

Referring first to the drawing of FIG. 13, there will be described in particular the passbook printing apparatus of the depositing machine.

The passbook P is of the same form as the one shown in FIGS. 4(*a*) and 4(*b*). At the back or left of an inlet 191 on the front or right-hand side of the passbook printing apparatus is a rectilinear path 192, as indicated by chain line, to carry the passbook P by means of a plurality of paired rollers 193, 194, 195, 196 and 197. The paired rollers 193 to 197 are rotated all together by a reversible pulse motor 198 to advance or retreat the passbook over a distance corresponding to the number of input pulses.

In the path 192, there are arranged a shutter 199 to be operated by a solenoid 200, a read/write unit 201 to read and write information from and in the magnetic stripe on the passbook, a page information detector unit 202 to detect the bar mark 75 (FIG. 4(*b*)) on the page at which the passbook is opened and the number of the column lastly subjected to printing, a two-way page turning mechanism 203, and a printing mechanism 204, in this order from the front.

The detector 202 is composed of a condensing lens 205, a photoelectric element 206 for photoelectrically converting the information on the leaves of the passbook by means of the condensing lens 205, and lamps 207 and 208 for illumination. The printing mechanism 204, which includes a single platen 209 and a printing head 210 facing thereto, performs printing on a journal paper (not shown) as well as printing on the passbook P, which is the same function as those of the printing mechanisms shown in FIGS. 2 and 6.

On the path 192, sensors 211, 212, 213 and 214 optically detecting the passage of the edge of the passbook are arranged in several positions.

First, the passbook P is opened and inserted into the inlet 191. Then, the sensor 211 is turned from "LIGHT" to "DARK" to apply a signal to the solenoid 200 and open the shutter 199. At the same time, the pulse motor 198 is started, and the passbook P is carried in the forward direction on the path 192 by the paired rollers 193 to 197.

When the passbook P turns the sensor 212 from "DARK" to "LIGHT", the pulse motor 198 is stopped after production of a predetermined number of pulses, and the shutter 199 is closed.

Information is read out from the magnetic stripe 78 of the passbook P which is located in the read/write unit 201, and are stored in a memory unit 216 through a magnetic information processing unit 215.

Then, the pulse motor 198 is reversed, and a page information processing unit 217 detects the bar mark on the passbook in response to a turn of the sensor 212 from "LIGHT" to "DARK", and the pulse motor 198 is stopped after production of a predetermined number of pulses.

Subsequently, the pulse motor 198 is rotated again in the forward direction, and the page information processing unit 217 detects the existence of printing information in each column of the passbook P in response to a turn of the sensor 212 from "DARK" to "LIGHT". A signal from the detector unit 202 is converted at the page information processing unit 217 into the number of the double-spread page and the number of the lastly printed column, which are compared respectively, in a main control unit 218, with the page number and the last column number on the magnetic stripe 78 stored in the memory unit 216. If they prove to be consistent as a result of such comparison, the pulse motor 198 is once reversed, and stopped when the sensor 213 is turned from "LIGHT" to "DARK". When the sensor 213 is turned again from "DARK" to "LIGHT", a predetermined number of pulses are applied to the pulse motor 198 for forward rotation so that the column next to the lastly printed column which is determined previously, i.e. the first column for the start of printing, may reach the printing position, and then the motor 198 is stopped to set the passbook in the printing position. At this time, the sensor 214 is expected to be turned to "DARK" by the passbook. If the sensor 214 is "LIGHT", it should be judged that the passbook P is held up on the path, failing to reach the printing position.

A transmission control unit 219 transmits the account number, etc. to a central controller 220, which reads out information for the account concerned from a ledger file 221, and delivers them to the transmission control unit 219 in return. Then, the transmission control unit 219 actuates the printing head 210 through a printing head control unit 222, thereby performing printing on the passbook.

When the printing is completed, the pulse motor 198 is reversed to transfer the passbook P toward the inlet 191. In this return process, the passbook is once stopped at the read/write unit 201, where new transaction data are written in the magnetic stripe of the passbook.

If the passbook requires page turning in the course of the aforesaid operation for passbook transaction, the passbook is sent over to the page turning mechanism 203. The page turning mechanism 203 operates in accordance with a control signal given by the main control unit 218 through a turn-page control unit 224.

Figure 14:
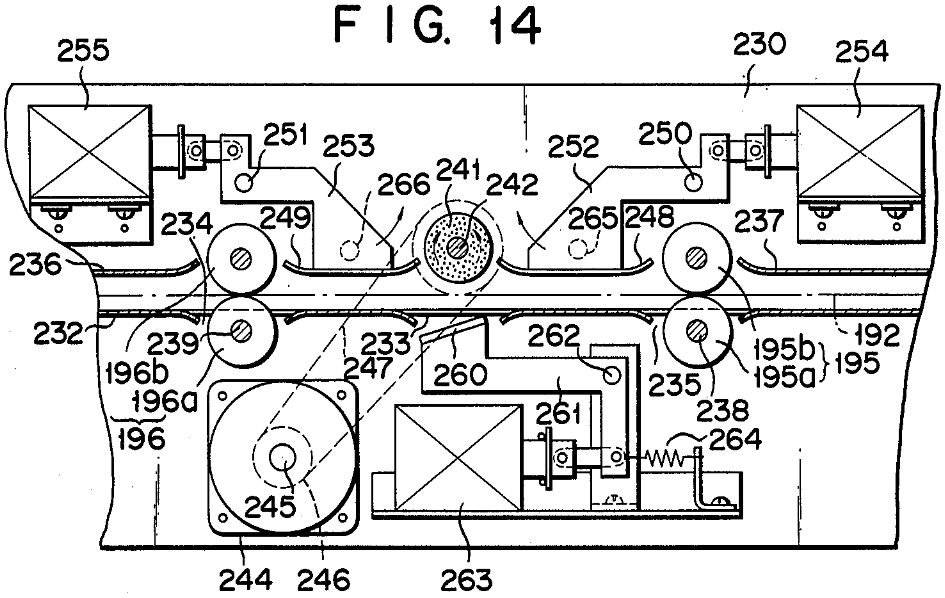
FIG. 14 is an enlarged profile of the two-way page turning mechanism in the printing system of FIG. 13.
Figure 15:
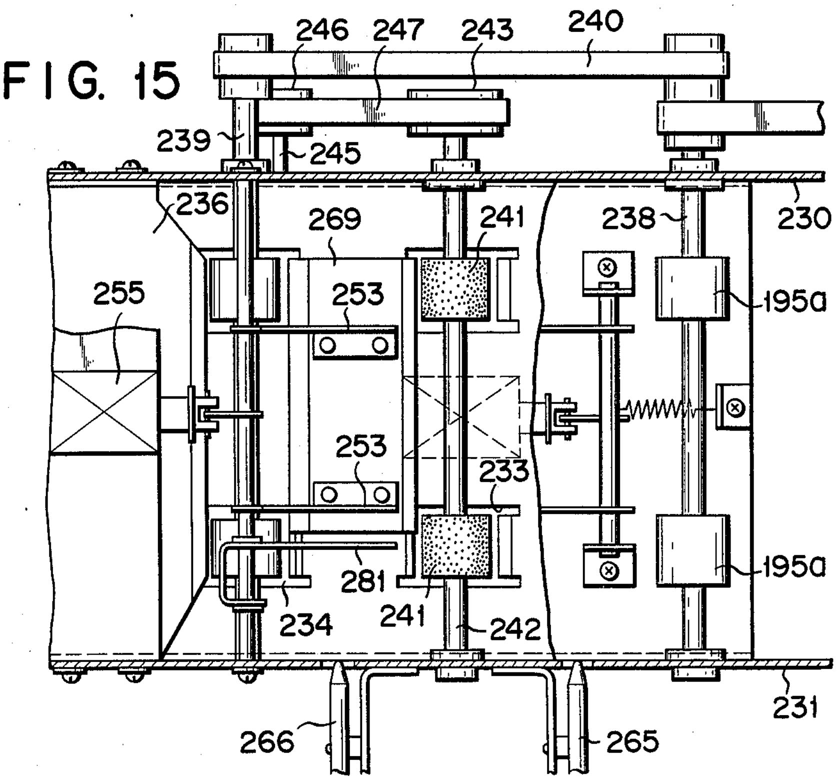
FIG. 15 is a partially broken top view of the mechanism of FIG. 14.

Referring now to FIGS. 14 to 17, a lower guide plate 232 with openings 233, 234 and 235 is fixed below the path 192 between side plates 230 and 231. Above the guide plate 232 are a plurality of upper guide plates 236 and 237 extending crosswise in parallel with the plate 232 and fixed to the side plates 230 and 231. In the two openings 234 and 235 exist upper and lower paired driving rollers 195 and 196, respectively. As shown in FIG. 15, these upper and lower rollers are disposed on each side. Lower rollers **195*a* and 196*a* are connected so as to interlock one another by means of an endless belt 140 stretched between the extended end portions of respective shafts 238 and 239 of the rollers 195*a* and 196*a*. Also, these rollers are connected to the pulse motor 198 (FIG. 13**).

Between the upper and lower paired rollers 195 and 196 are friction rollers 241 overlying the opening 233. A shaft 242, on which the friction rollers 241 are fixed, is supported by the side plates 230 and 231, having its extended end fitted with a pulley 243. The pulley 243 is connected by means of an endless belt 247 with a pulley 246 mounted on a motor shaft 245 of a reversible pulse motor 244 as shown in FIG. 14. The friction rollers 241 can, therefore, rotate in either direction.

In front and at the back of the friction rollers 241 are movable guide plates 248 and 249 facing the lower fixed guide plate 232. These movable guide plates 248 and 249 are fixed respectively to levers 252 and 253 rockably mounted on shafts 250 and 251 that are supported by the side plates 230 and 231. The levers 252 and 253 are connected to plunger solenoids 254 and 255, respectively. When the solenoids 254 and 255 are deenergized, the levers 252 and 253 are in the lowered position of FIG. 14 where they are in close vicinity to the lower guide plate 232, defining therebetween a path to guide the passage of the passbook. When the solenoids 254 and 255 are energized, the levers 252 and 253 rock in the directions of arrows of FIG. 14 to move the guide plates 248 and 249 upward.

A movable anvil member 260 is disposed under the friction roller 241, facing the same. The member 260 is fixed to one end of a two-arm lever 261 rockable round a shaft 262. The other end of the lever 261 is connected to a plunger solenoid 263. When the solenoid 263 is deenergized, the movable anvil member 260 is in a position spaced from the friction rollers 241, as shown in FIG. 14. When the solenoid 263 is energized, however, the two-arm lever 261 rocks clockwise (FIG. 14) round the shaft 262 to press the anvil member 260 against the friction roller 241 through the passbook P. The lever 261 is returned from the rocked position to the position of FIG. 14 by the action of a spring 264.

As partially shown in FIG. 15, retaining pins 265 and 266 are disposed respectively in front and at the back of the friction rollers 241 and outside the side plate 231. The retaining pins 265 and 266 have the same function of the support pins 152 and 153 as shown in FIG. 8. The operative mechanism of these retaining pins is shown in detail in FIG. 17 only with respect to the pin 266. Both retaining pins 265 and 266 can advance and retreat across the direction of the passbook transfer.

Figure 17:
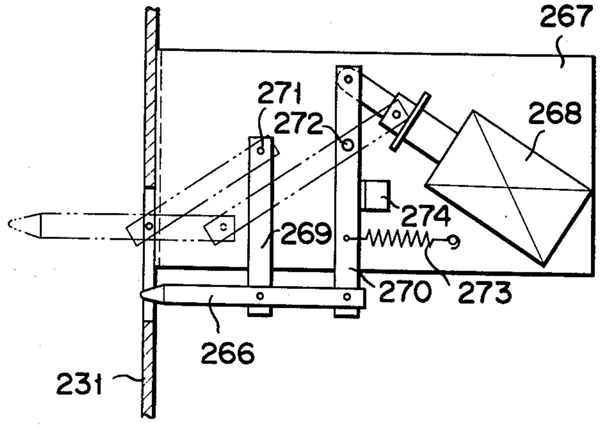
FIG. 17 shows principal parts of the page turning mechanism of FIGS. 14 and 15 associated with a retaining pin.

In FIG. 17, a plunger solenoid 268 fixed to a subframe 267 and the retaining pin 266 are connected by means of two parallel levers 269 and 270. The two levers 269 and 270, which are rockable round fixed pivots 271 and 272 on the subframe 267 respectively, tend to move the tip of the retaining pin 266 upward and to the inside of the side plate 231 (to the left of FIG. 17) shown in a chain line while keeping the parallel relative position when the solenoid 268 is energized. When the solenoid 268 is deenergized, the retaining pin 266 is located in the full-line position of FIG. 17 where the lever 270 is brought in contact with a stopper 274 by a spring 273. In this position, the tip of the pin 266 is retreated.

Figure 16:
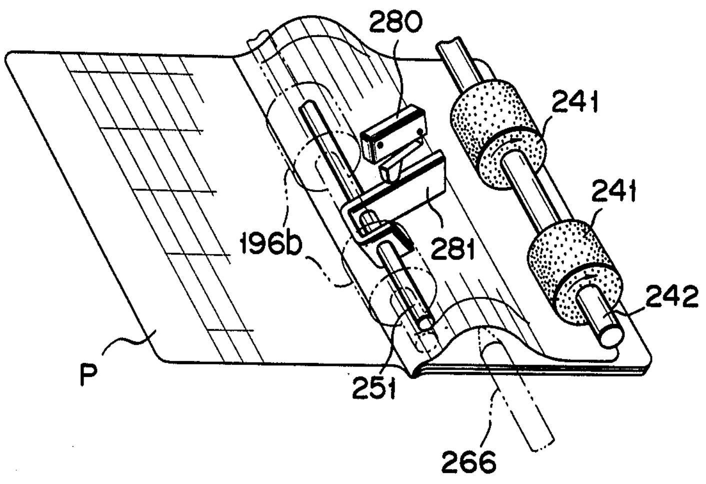
FIG. 16 is a perspective view of principal parts of the page turning mechanism shown in FIGS. 14 and 15, illustrating the manner of passbook page turning operation.

In FIG. 16, there is shown a microswitch 280 which has the same function of the microswitch 151 shown in FIG. 7. Facing the switch 280, a detection arm 281 is rockably mounted on the shaft 251 for the movable guide plate 249. The detection arm 281 tends to rock round the shaft 251 to turn the microswitch 280 on while keeping in touch with the surface of the uppermost leaf of the passbook when the friction rollers 241 are rotated in the direction of the arrow to slide and lift the uppermost leaf curvedly.

Although FIG. 16 shows only the detection arm that is mounted on the shaft for one movable guide plate 249, a similar detection arm is mounted on the shaft 250 for the other movable guide plate 248, facing another microsswitch.

As may be seen from FIGS. 14 and 15, many members of the page turning mechanism 203 of the above-mentioned construction are arranged symmetrically with respect to the friction rollers 241 along the longitudinal direction of the mechanism. Such members include, for example, the paired rollers 195 and 196, movable guide plates 248 and 249, and the retaining pins 265 and 266. These symmetrically arranged sections are used selectively depending on the direction of the passbook page turning, cooperating with the central friction rollers 241.

Figure 18:
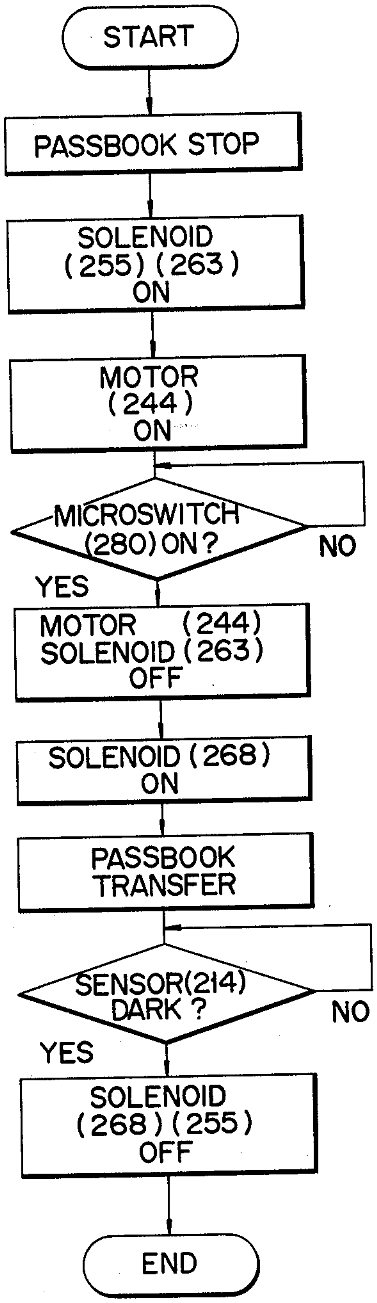
FIG. 18 is a flow chart for illustrating the operation of the page turning mechanism shown in FIGS. 14 and 15.
Figure 19:
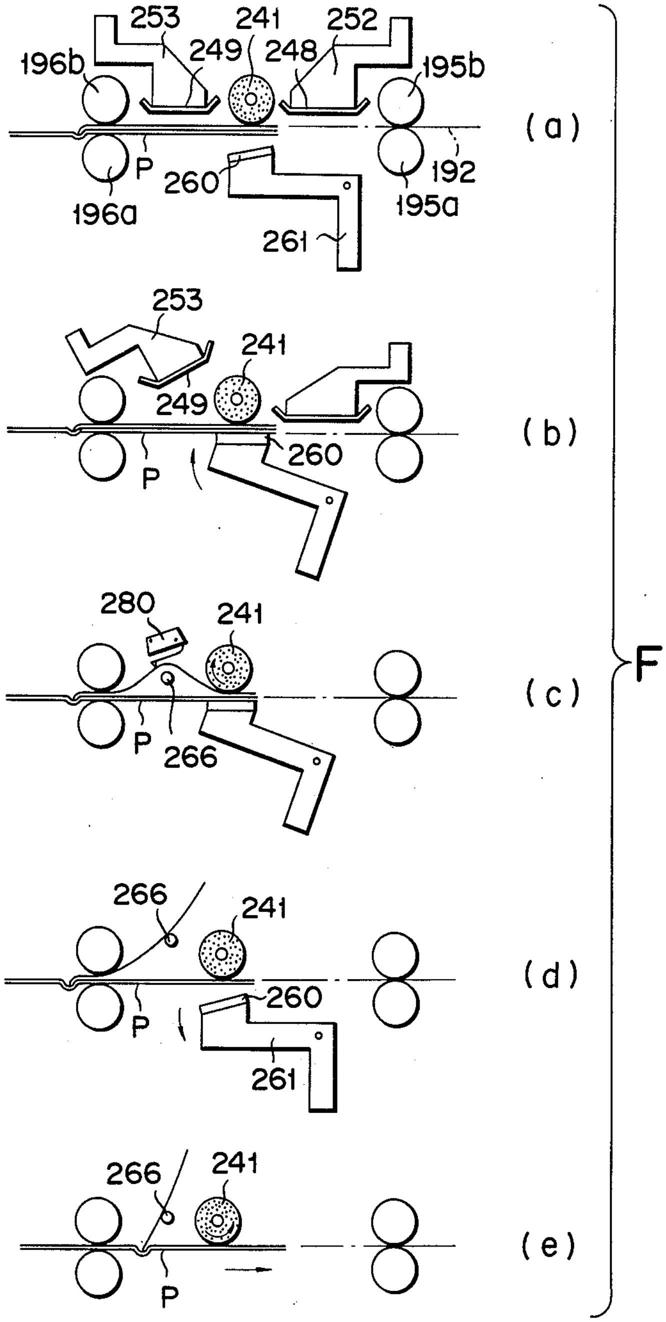
FIGS. 19(a) to 19(e) show a series of operations of the page turning mechanism according to the flow chart of FIG. 18.

Referring now to FIGS. 18 and 19, there will be described the page turning operation for the passbook.

If the page concerned is filled up in the course of a passbook printing operation before all the information to be printed are not printed yet, the pulse motor 198 (FIG. 13) first is reversed to transfer the passbook P correspondingly to a predetermined number of pulses that are applied to the motor in response to a turn of the sensor from "DARK" to "LIGHT" and thus the passbook is stopped at one set position (FIG. 19(*a*)) in the page turning mechanism. Namely, in this position, the region near the marginal edge of a leaf on one side of the opened passbook is located correspondingly to the friction rollers 241, while the region of the same leaf near the binding edge is held between the upper and lower rollers **196*a* and 196*b***. Thus, these paired rollers constitute a clamp means.

By energizing the plunger solenoid 263, the arm 261 is rocked clockwise to press the anvil member 260 against the friction rollers 241 through the passbook P. At the same time, the movable guide plate 249 is moved upward as shown in FIG. 19(*b*)) by energizing the plunger solenoid 255.

Then, by driving the motor 244 in one direction to rotate the roller 241 clockwise as shown in FIG. 19(*c*), the uppermost leaf of the passbook pressed against the roller 241 is lifted curvedly. When the surface of the leaf causes the microswitch 280 to be turned on by means of the detection lever 281, the driving motor 244 is stopped, and the friction rollers 241 are stopped at the rotating position. In FIG. 19(*c*) the detection lever 281 is omitted for simplicity, and the switch 280 is in direct contact with the leaf surface.

Thereafter, the solenoid 268 is energized to insert the retaining pin 266 between the lifted uppermost page of the passbook and the unlifted immediately following page, and then to raise the pin 266 as shown in FIG. 19(*d*). At the same time, the solenoid 263 is deenergized to release the anvil member 260 from the engagement with the friction roller 241. Then, the lifted uppermost leaf is removed entirely from the other leaves by the movement of the retaining pin 266.

Thereupon, when the passbook P is advanced in the direction of an arrow of FIG. 19(*e*) while keeping the retaining pin 266 as it is, the lifted uppermost leaf falls down of itself on the opposite side of the double-spread page of the passbook, whereby the turning of a leaf is accomplished.

Thereafter, the passbook P which has undergone the page turning is delivered again to the printing mechanism 204. When the sensor 214 is turned to "DARK", both the solenoids 268 and 255 are deenergized to retreat the retaining pin 266 and to return the movable guide plate 249 to the lowered position.

When turning a leaf of the passbook P in the reverse direction, the passbook is set in a position symmetrically corresponding to the first set position of FIG. 19(*a*)

with respect to the friction rollers 241. In this case, the other paired rollers 195*a* and 195*b* are used for the passbook clamp means. As for the steps of page turning operation, they are executed in the same manner as shown in FIGS. 19(*a*) to 19(*e*), only by means of the members in the symmetrical section on the opposite side of the rollers 241. Further, in this case, the friction rollers 241 are rotated in the opposite direction.

What is claimed is:

1. A passbook printing apparatus, comprising:

a passbook inlet;

a substantially straight passbook path with a fixed length and having one end connected to said inlet, said path defining a printing position for a passbook;

passbook conveying means capable of being driven so as to feed the passbook in one direction from said inlet along said passbook path and to return said passbook to said inlet in the opposite direction;

printing means including a common platen, said platen being disposed in the printing position in said passbook path;

a journal paper having a part always placed on said platen; and feed means for feeding said journal paper on said platen.

2. A passbook printing apparatus according to claim 1, wherein said passbook conveying means includes an endless belt disposed along said path substantially throughout the length of said path, and a pulse motor intermittently driving said belt.

3. A passbook printing apparatus according to claim 1 further comprising passbook guide means disposed in front and at the back of said platen to hold said platen therebetween, whereby said passbook is held open on said platen bearing said journal paper when said passbook is brought to the printing position.

4. A passbook printing apparatus according to claim 1, wherein said journal paper feed means includes a pulse motor.

5. A passbook printing apparatus according to claim 3, wherein said platen partially invades said path, thereby holding in cooperation with said guide means said passbook on said platen so that said passbook is spread out to an angle exceeding 180° for printing.

6. A passbook printing apparatus according to claim 1 further comprising optical detector means disposed in the vicinity of said passbook inlet, whereby the passage of said passbook through said path is sensed.

7. A passbook printing apparatus, comprising:

a passbook inlet;

a substantially straight passbook path with a fixed length and having one end connected to said inlet, said path defining a printing position for a passbook;

passbook conveying means capable of being driven so as to feed the passbook in one direction from said inlet along said passbook path and to return said passbook to said inlet in the opposite direction;

printing means for printing on the passbook and a journal paper, including a platen disposed in the printing position of said passbook path; and a passbook page turning mechanism disposed on said passbook path.

8. A passbook printing apparatus according to claim 7, wherein said page turning mechanism includes passbook clamp means for clamping the opened passbook disposed in a page-turning position, an anvil member, friction roller means pressing the passbook against said anvil member and capable of selective rotation, and leaf retaining means capable of advancing and retreating crosswise between a leaf of the passbook partially curvedly turned by the rotation of said roller means and another leaf left unturned following said partially turned leaf.

9. A passbook printing apparatus according to claim 7, wherein said page turning mechanism includes an arm rockable between a clamp position and a release position, a friction roller rotatably mounted on said arm, a passbook clamp member supported by said arm at a space from said friction roller, an anvil member against which said friction roller is pressed through the opened passbook disposed in the page-turning set position when said arm is in said clamp position, a stationary clamp plate facing said clamp member, said clamp plate clamping the opened passbook in cooperation with said clamp member when said arm is in said clamp position, retaining pins capable of advancing and retreating crosswise into and from said passbook path, said pins penetrating between a leaf of the opened passbook partially curvedly turned by the rotation of said friction roller and an unturned lead following said partially turned leaf.

10. A passbook printing apparatus according to claim 8 or 9 further comprising a microswitch so located as to come into contact with said partially curvedly turned leaf of the passbook, whereby performance of the partial turning of said leaf of the passbook is confirmed.

11. A passbook printing apparatus according to claim 8, wherein said clamp means clamps a leaf on one side of the opened passbook in said page-turning position by a portion near the binding edge of said passbook, and said roller means is pressed against a portion near the marginal edge of said leaf on said one side of the passbook in said page-turning position.

12. A passbook used for the passbook printing apparatus according to claim 11, the portion near the marginal edge of each page of the passbook against which said roller means is pressed is formed as a non-printed portion covering a fixed width along the marginal edge.

13. A passbook printing system for an automatic depositing machine, comprising:

a passbook inlet;

a passbook path with a fixed length and having one end connected to said inlet;

a printing mechanism disposed in a printing position defined in said path, said printing mechanism including a single platen on which part of a journal paper is always put;

read/write means for a passbook disposed in said path between said inlet and said printing mechanism; and passbook page turning mechanism disposed in said path on the opposite side of said printing mechanism to said read/write means and in close vicinity of said printing mechanism, whereby printing for the journal paper and for the passbook is performed selectively.

14. A banking apparatus using passbooks, comprising;

an inlet through which a passbook is inserted;

a passbook path with one end connected to said inlet;

a driving mechanism carrying the passbook along said path; and a passbook page turning mechanism disposed in said passbook path.

15. A banking apparatus using passbooks, comprising:

an inlet slit through which an opened passbook is inserted;

a passbook path with one end connected to said slit, said path having a printing position defined therein;

passbook printing means disposed in said printing position of said path; and a two-way page turning mechanism disposed in close vicinity to and in front or at the back of said printing means in said path, whereby the leaves of the opened passbook inserted through said slit are turned selectively in either direction.

16. A banking apparatus using passbooks according to claim 15, wherein said two-way page turning mechanism includes a friction roller capable of selective rotation in either direction, anvil means facing said roller and holding the passbook between said means and said roller, passbook clamp means disposed in front and at the back of said roller at spaces therefrom, passbook guide means disposed respectively between said clamp means and said friction roller, and page retaining means disposed respectively between said clamp means and said friction roller and capable of advancing and retreating crosswise.

17. A banking apparatus using passbooks according to claim 16, wherein said anvil means includes a two-arm rockable lever with a contact surface facing said friction roller and magnet means to rock said lever.

18. A banking apparatus using passbooks according to claim 16, wherein each said guide means includes a magnetically rockable lever with a guide surface.

19. A banking apparatus using passbooks according to claim 16, wherein said page retaining means include pins, a link mechanism connected to said pins so as to advance and lift said pins crosswise and upward, and magnet means to operate said link mechanism.

20. A banking apparatus using passbooks according to claim 15, wherein said two-way page turning mechanism includes a friction roller capable of selective rotation in either direction, clamp means disposed in front and at the back of said roller at spaces therefrom and each including a pair of rollers in touch with each other, the distance between each said clamp means and said friction roller being shorter than the length of a leaf of the opened passbook, an anvil member facing said friction roller and magnetically rockable between a position where said clamp means holds the inserted passbook in cooperation with said friction roller and a release position, stationary passbook guide members disposed respectively between said clamp means and said friction roller, magnetically rockable guide members facing said guide members, and passbook page retaining means capable of advancing and retreating crosswise respectively between said clamp means and said friction roller.

21. A banking apparatus using passbooks according to claim 20 further comprising detector means disposed between said friction roller and each said clamp means and coming into contact with a leaf of the passbook when said leaf is partially turned by means of said friction roller, thereby detecting the performance of the page turning operation.

* * * * *